Jan. 31, 1961 W. F. LEONARD 2,969,687

SHIFTER MECHANISMS FOR MULTI-SHIFT TRANSMISSIONS

Filed Nov. 26, 1958 3 Sheets-Sheet 1

INVENTOR.
WILLIAM F. LEONARD
BY Brown, Jackson, Boettcher & Dienner
ATTYS.

Jan. 31, 1961 W. F. LEONARD 2,969,687

SHIFTER MECHANISMS FOR MULTI-SHIFT TRANSMISSIONS

Filed Nov. 26, 1958 3 Sheets-Sheet 2

INVENTOR.
WILLIAM F. LEONARD
BY Mason, Jackson
Boettcher & Dienner
ATTYS.

Jan. 31, 1961 W. F. LEONARD 2,969,687

SHIFTER MECHANISMS FOR MULTI-SHIFT TRANSMISSIONS

Filed Nov. 26, 1958 3 Sheets-Sheet 3

INVENTOR.
WILLIAM F. LEONARD
BY Brown, Jackson Boettcher & Dienner
ATTYS.

United States Patent Office 2,969,687

Patented Jan. 31, 1961

1

2,969,687

SHIFTER MECHANISMS FOR MULTI-SHIFT TRANSMISSIONS

William F. Leonard, Jackson, Mich., assignor to Clark Equipment Company, a corporation of Michigan Filed Nov. 26, 1958, Ser. No. 776,511

7 Claims. (Cl. 74—335)

My invention relates to shifter mechanism for use, for example, with a multi-shift transmission for a self-propelled vehicle, and more particularly, to provide for selectively controlling motor means or a power shifting device for effecting or assisting the making of desired shifting operations in the transmission in accordance with the selected manual manipulation of the shifter mechanism.

In heavy duty self-propelled machines it is desirable for the operator or the driver to have the machine under his selective manual control, but to afford efficiency and ease in effecting change in direction of drive or drive ratio through the transmission, it is desirable that a power source in the form of suitable motor means be used for assisting or effecting appropriate actuation of the transmission. Such motor means is especially desirable on remote control applications; that is in instances in which the transmission is located remotely from the cab or operator's station so that it is necessary to employ intervening means in the form of linkage or Bowden wires and the like to operate the motor means.

Arrangements of the aforementioned category are known and my present invention directs itself to an improved shifter mechanism and compact integration thereof with a multi-speed transmission and motor means for effecting or assisting power shifting of the transmission.

Compactness of the aforementioned assembly is important as, for example, in hauling equipment including tractor and semi-trailer components wherein vertical space for the multi-speed transmission for the tractor is at a premium, and especially so in tractors characterized by the cab over engine arrangement. In the latter, the fifth wheel for connection with the semi-trailer must have freedom of movement, as for example, in ascending an incline there must be sufficient vertical clearance to avoid interference between the front end of the semi-trailer and the top of the transmission case.

My present invention is concerned with the aforementioned problem, and accordingly, it is an object of my invention to provide an improved manually controllable shifter mechanism, the manipulation of which affords the selection and application of power of motor means or power shifting device to shift shiftable members such as the shift rails of a multi-shift transmission, and which shifter mechanism is assembled in a manner with the upper end of the transmission without materially effecting the desired overall height of the latter.

As aforementioned, the shifter mechanism of my invention is adapted to be associated with a multi-shift transmission and motor means both of which may be largely of known construction and operation. In this regard the motor means may comprise a power piston and power cylinder assembly, and control valve means including a movable control tube or valve rod and power tube or sleeve, in which the control tube or valve rod is movable to afford the selective admission of fluid under pressure to the power cylinder opposite either or

2 both ends of the power piston to retain the latter against movement or to move the power piston in one direction or other in the power cylinder, to afford source of force for shifting the transmission.

It is a further object of my invention to provide an arrangement of novel shifter mechanism, motor means and transmission in which the motor means and certain components of the shifter mechanism lie to one side of the transmission and in which the shifter mechanism and motor means do not extend above the top cover of the housing for the transmission.

In order to achieve the aforementioned objects, I propose to provide shifter mechanism including manually operable shift rail selector lever means rotatable about an axis transverse to the axes of movement of the shift rails of the transmission and to one side thereof, and in which rotary movement of the shift rail selector lever affords sliding movement of a slide member transverse to the transmission shift rails for selective alignment with the shift lugs of the latter. The arrangement of the parts is such that the slide member has movement in a horizontal plane immediately above the transmission shift rails and below the cover for the transmission to provide an assembly of low silhouette. The motor means for effecting or assisting the manually selector operation of the transmission extends along the latter at the same side as the shift rail selector lever, and the aforementioned slide member is carried by a slide carriage which is made fast to the power tube or sleeve of the motor means. In such arrangement of parts the top cover for the transmission lies immediately above the slide member and retains or prevents the slide member from disassociation from the slide carriage and thus importantly enables the arrangement of the shift mechanism with the transmission below the top cover for the transmission. The motor means further includes a control tube or valve rod extending coaxially of and within the power tube or sleeve and the control tube or valve rod is under selective manipulation by the operator of the vehicle to effect desired actuation of the motor means, to drive the power tube, slide carriage, and slide to shift the selected transmission shift rail. In the arrangement of my present invention, the shift rail selector lever and the control tube or valve rod of the motor means may be conveniently actuated by suitable linkage if desired, although it is preferred that these mechanisms be under the control of the operator through known Bowden wires. Additionally, although not necessary, it is preferred to utilize air under pressure as the source of fluid under pressure for actuation of the motor means.

It is thus a further object of my invention to provide shifter mechanism comprising shift rail selector lever means rotatable about an axis lying laterally of the axes of movement of the shift rails of the transmission together with slide means including a slide member movable rectilinearly in a slide carriage between the shift rail selector lever means and the transmission shift rails for selective alignment with the shift lugs of the transmission shift rails.

It is a further object of my invention to provide a shifter mechanism as last noted in which the cover of the transmission housing is cooperatively arranged in regard to the slide carriage and slide means to retain the slide means in slide carriage.

It is a further object to provide a shifter mechanism comprising rotatable shift rail selector lever means, slide means including a slide carriage and slide member and in which the slide member has movement transverse to the axes of movement of the shift rails of the transmission, but in which the slide member is movable conjointly with the slide carriage in a direction lengthwise of the shift rails of the transmission.

It is a further object of my invention to provide shifter mechanism including slide means as aforesaid in which the slide carriage thereof is adapted to have connection with the power tube or sleeve of motor means for effecting or assisting power shifting of the shift rails of a transmission.

The above and further objects and advantages of my invention will appear from the detailed description.

Now in order to acquaint those skilled in the art with the manner of construction and utilizing a shifter mechanism in accordance with my invention, I shall describe in connection with the accompanying drawing, a preferred embodiment of my invention.

Figure 1:
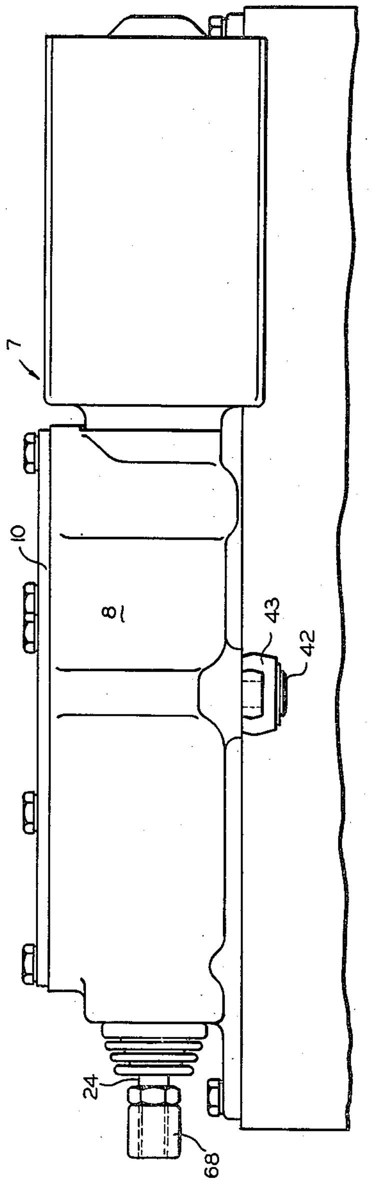
Figure 1 is a side elevation view of the shifter mechanism of my invention showing its association with motor means and the upper end portion of a transmission.
Figure 3:
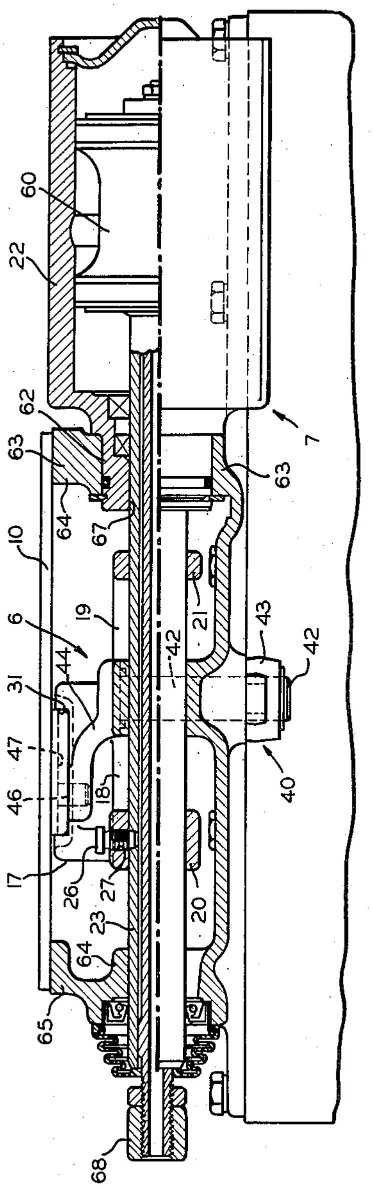
Figure 3 is a detail vertical secional view taken substantially along the line 3—3 of Figure 2 looking in a direction indicated by the arrows.
Figure 2:
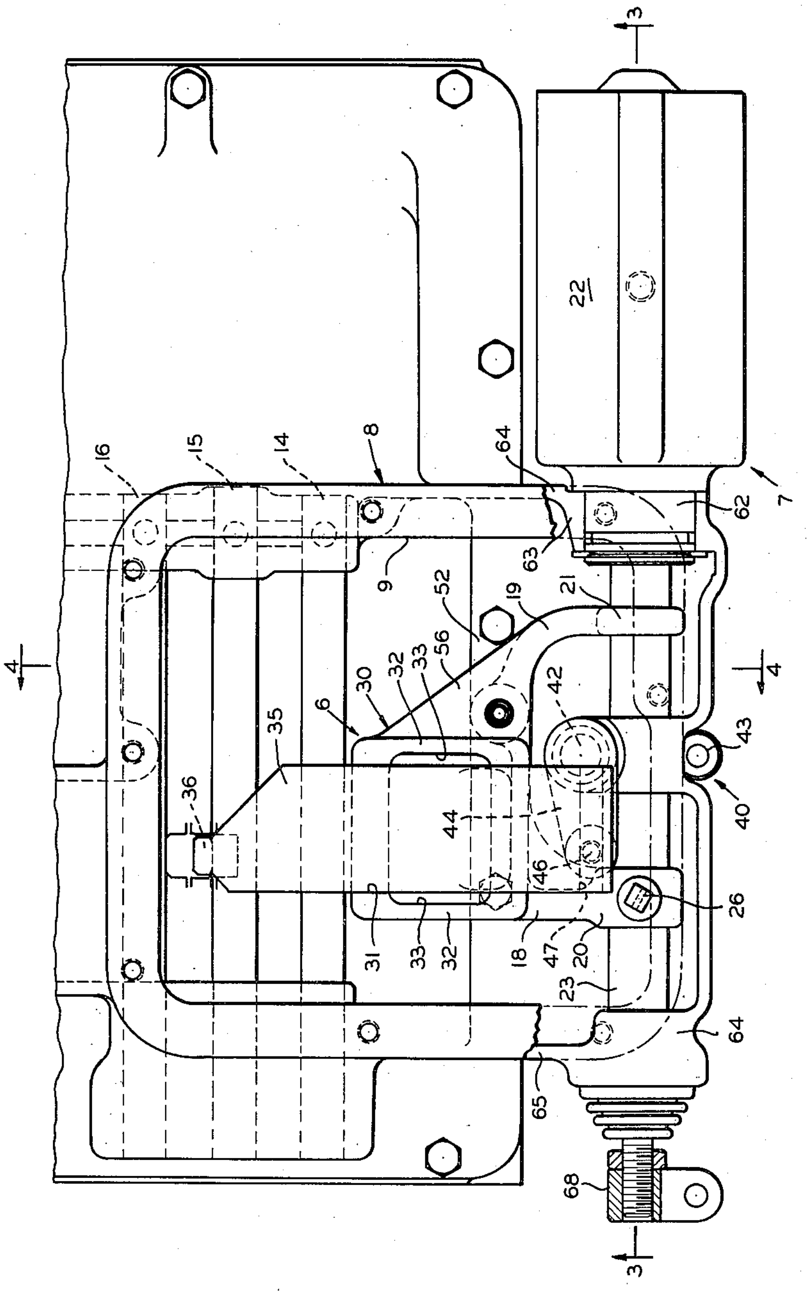
Figure 2 is a plan view of the mechanism shown in Figure 1 with the top cover for the transmission removed.

In the embodiment of my invention shown in the drawings there is shown, as best seen in Figures 2 and 3, an organization of parts including shifter mechanism indicated generally at 6, motor means 7, and a multi-shift transmission 8. The transmission 8 may be largely of conventional construction but for purposes of my present invention the housing therefor is preferably open at its upper end as indicated at 9. A cover 10 adapted to be secured to the transmission housing by a plurality of bolts is provided for closing the opening 9 and as will later be described is cooperatively associated with the shifter mechanism 6.

The transmission 8 to one side thereof and below the open upper end 9 of the housing includes a plurality of spaced parallel shift rails 14, 15 and 16 mounted in the usual manner for sliding movement to and fro lengthwise of their longitudinal axes to effect selected direction of drive and drive ratios. For purposes of the present invention the oganization of the gear trains for effecting the desired direction or gear ratio of drive are of no moment, and any known construction in this regard may be utilized, the only requirement being that selective longitudinal axial movement of the shift rails affords the desired direction of drive and drive ratio. Thus the several shift rails may have connection to suitable shift yokes or forks associated with the gear mechanism of the transmission in any conventional manner in practicing the present invention.

The shifter mechanism 6, as best seen in Figures 2 and 3, comprises a bifurcated slide carriage 17 including arm members 18 and 19 having integral annular collars 20 and 21, respectively, encircling a power tube or force applying member 23 of motor means 7 at portions spaced axially thereof. The motor means 7 is hereinafter referred to in sufficient detail to afford an understanding of my present invention, and for the present, it is sufficient to observe that the motor means 7 includes a power cylinder 22, a power tube 23, and a control tube or valve rod 24, coaxially disposed on an axis parallel with the axes of shift rails 14, 15 and 16 extending lengthwise of the transmission housing at the side thereof opposite the shift rails and lying below the plane of the cover 10 or upper end of the transmission. The slide carriage 17 is made fast to the power tube or power sleeve 23 by means of lock screw 26 threaded in annular collar 20 with its inner reduced end in engagement with an opening 27 formed to receive the same in power tube or power sleeve 23. The slide carriage 17 is thus movable axially with the power tube 23 as will be described, and the annular collars 20 and 21 anchor the slide carriage and prevent twisting of the same in a plane through the longitudinal axis of the power tube or sleeve 23.

The slide carriage 17 further comprises a platform portion 30 having a channel 31 defined by parallel marginal vertical edge portions 32—32 each of which is recessed at its inner surface as indicated at 33 to provide four slide bearing surfaces at the opposite ends of the edge portions 32—32. The channel 31 is thus formed to provide for the support of slide member 35 rectilinearly in a direction transverse to the axes of the shift rails 14, 15 and 16 and the longitudinal axis of motor means 7. The slide member 35 at the end thereof projecting toward the shift rails is provided with a depending shift rail lug engaging member 36 which is adapted to be aligned, as aforementioned, with the selected lug elements of any one of the shift rails 14, 15 and 16.

Figure 4:
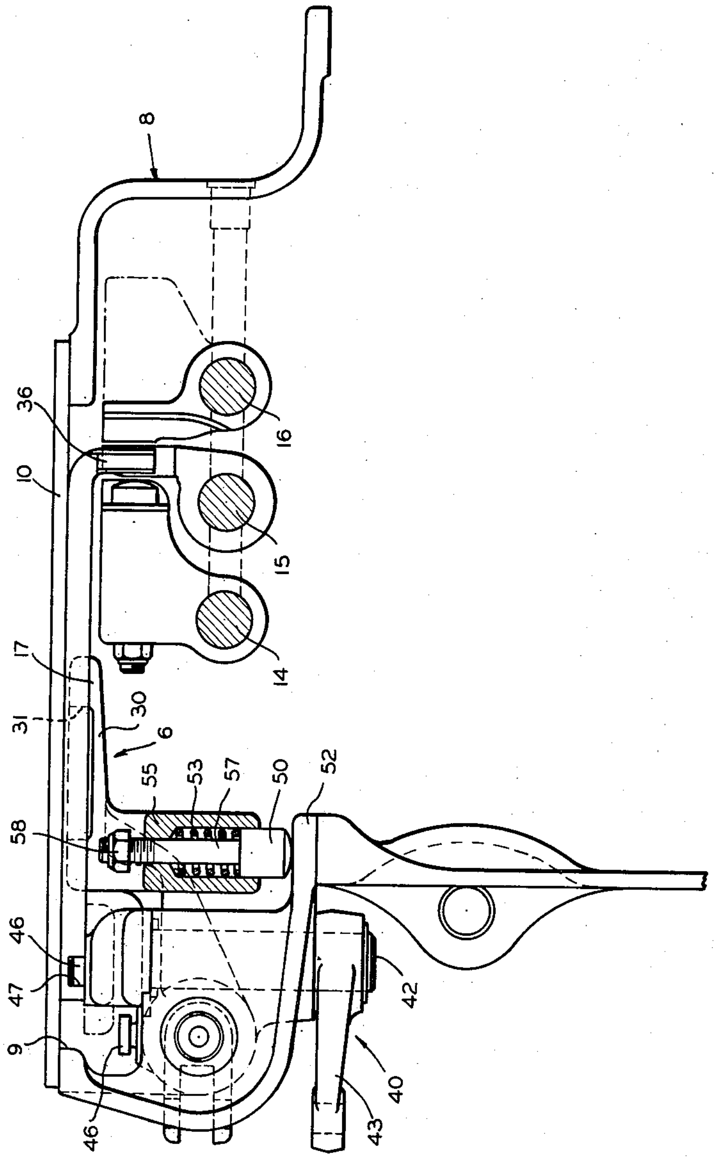
Figure 4 is a vertical transverse sectional view taken substantially along the line 4—4 of Figure 3 and looking in a direction indicated by the arrows.

In order to afford rectilinear sliding movement of slide 35, the shifter mechanism of my invention further comprises shift rail lever selector means, illustrated generally at 40 and which, as shown, comprises a vertically extending shaft 42 suitably journalled in the transmission housing to the same side thereof as motor means 7. A crank arm 43 is suitably secured to the outwardly downwardly projecting end of shaft 42 and the inner end of shaft 42 has a second crank arm 44 fixed thereto. The crank arm 44 at its outer end carries a pin 46 which is adapted to ride in a groove or slot 47 extending inwardly from the bottom surface of slide 35 and transversely to the aforenoted direction of rectilinear sliding movement of slide 35. Thus upon imparting rotary movement to shaft 42 about its axis by rotating crank arm 43 in one direction or the other, rotary movement is correspondingly imparted to crank arm 44, and which by sliding engagement of pin 46 in slot 47 of slide member 35 effects sliding movement of slide member 35 in slide carriage 17 in a direction transverse to the axes of shift rails 14, 15 and 16 to align the shift lug 36 as desired in regard to any one of the several shift rails. As previously mentioned, cover 10 provides for closing of the upper open end of the transmission housing and additionally the inner surface of the cover 10 opposite the upper surface of slide 35 serves to retain the slide against vertical displacement from channel 31 in slide carriage 30. Additionally, it is desirable to yieldingly bias the upper surface of slide 35 into engagement with the inner surface of cover 10 in retaining the slide and slide carriage in assembled relation and to this end I provide, as best seen in Figure 4, a plunger 50 which is biased into engagement with a lengthwise extending rail or ledge 52 of the transmission housing by means of a spring 53 disposed within a bore of a boss 55 formed integral with and at a web portion 56 of slide carriage 30. The plunger 50 includes a vertically extending bolt portion 57 projecting upwardly through the boss 55 and carrying an adjustable threaded stop nut 58 for engaging the adjacent upper surface of boss 55 of the slide carriage to limit outward movement of plunger 50 when disengaged from rail 52. The spring 53 is maintained under compression in the assembled relation of the parts and tends to rotate the slide carriage upwardly about the axis of power tube 23 but which upward movement is restrained by the cover 10 to afford the aforementioned spring loaded frictional engagement of the upper surface of slide 35 with the inner surface of cover 10 to serve the purpose already noted.

As previously indicated motor means 7 per se in its essential respects is of known construction and for purposes of my present invention preferably comprises the power cylinder 22 having a power piston 60 mounted for reciprocal movement therein. The power tube 23 has fixed connection with the power piston 60 and axial movement of power tube is thus afforded by axial movement of power piston 60 in power cylinder 22. Control tube 24 previously mentioned is disposed coaxially of and within power tube 23 and movement of it longitudinally of its lengthwise axis is adapted through known means (not shown) to provide for the selective admission of fluid under pressure, preferably air, to either or both ends of cylinder 22 opposite the ends of piston 60 to provide for movement of piston 60 in one direction or the other or to maintain the piston 60 in a given position within cylinder 22. The motor means 7 is integrated with the transmission by the mounting of an integral collar 62 of power cylinder 22 in the bore of boss 63 in end wall 64 of the transmission housing. The power tube 23 is slidingly mounted in the bore 67 of collar 62 and the outer end of power tube 23 is also slidably mounted in the bore of a boss 64 in end wall 65 opposite wall 63 of the transmission. Suitable fluid seals are provided between the components just described in the conventional manner to afford appropriate mounting of the motor means 7 with the transmission and shifter mechanism. Motor means 7 as indicated, is known and may, for example, be of the constructions shown in the copending applications of myself and Lewis E. Henyon, Serial No. 704,935 and now Patent No. 2,926,635 and Serial No. 705,012 and now Patent No. 2,926,540, both filed December 24, 1957, and the disclosures of which applications are by reference included herein. Further, power assist devices embodying the essential mode of operation of the motor means 7 of my present application are shown and described in United States Patent No. 1,933,015 to Moorhouse, dated March 5, 1935, and United States Patent No. 2,152,914 to Price et al., dated April 4, 1939.

As seen in Figure 3, the outer end of control tube 24 projects outwardly of the transmission casing at the end thereof opposite power cylinder 22 and to which there is secured a bifurcated clamp member 68. In the installation of the mechanism aforedescribed in a vehicle suitable linkage or preferably Bowden wires are secured one each to crank arm 43 of shift rail selector lever means 40 and to the clamp or bracket member 68. It will thus be seen that upon actuation of the linkage or Bowden wire connected to the crank arm 43 the operator may effect sliding movement of slide 35 in slide carriage 17 to align the lug 36 with shift rails 14, 15 or 16 to afford the desired actuation of the transmission after which the operator by manipulation of the Bowden wire connected to clamp 68 at the outer end of the control rod 24 affords movement of control rod 24 in one direction or the other to energize power cylinder 22 and impart movement to the power piston 60 in one direction or the other and thus afford shifting of the selected shift rail in one direction or the other. In the particular arrangement shown, the transmission comprises three shift rails each of which control two conditions of operation of the transmission so that in the organization of parts shown, the operator by manipulation of two Bowden wires has at his control the selective actuation of the transmission for six different conditions, such, for example, as actuation of the transmission to effect reverse drive and actuation of the transmission to effect forward drive at five different drive ratios. It is believed that the construction and operation of the preferred embodiment of my invention herein shown and described and its relation to motor means 7 will be readily comprehended by those skilled in the art without further detail description of motor means 7 in view of the known construction and mode of operation of power shift assembly such as represented by motor means 7.

While I have shown and described what I consider to be a preferred embodiment of my invention it will be understood that various modifications and rearrangements may be made therein without departing from the spirit and scope of my invention.

I claim:

1. Shifter mechanism for a transmission including a shift rail movable lengthwise of its longitudinal axis comprising, a shift rail selector lever means mounted for rotation on an axis lying laterally of the longitudinal axis of said shift rail, a slide carriage movable on an axis parallel to the longitudinal axis of said shift rail, a slide member mounted for sliding movement in said slide carriage in a direction transverse to the longitudinal axis of said shift rail and slide carriage, and means connecting said shift rail selector lever means and said slide member for effecting sliding movement of the latter by rotation of said shift rail selector lever means about its axis.

2. Shifter mechanism for a transmission having a transmission housing open at its upper end and including a shift rail movable lengthwise of its longitudinal axis in said transmission housing below the opening thereof comprising, shift rail selector lever means mounted for rotation on an axis laterally of the longitudinal axis of said shift rail and below the opening of said transmission housing, a slide carriage mounted for movement on an axis parallel to the longitudinal axis of said shift rail and below the opening in said transmission housing, a slide member mounted for sliding movement in said slide carriage in a direction transverse to the longitudinal axes of said shift rail and slide carriage, a cover closing the opening of said transmission housing having its inner surface in juxtaposition of said slide member to retain the same in said slide carriage, and means connecting said shift rail selector lever means and said slide member for effecting sliding movement of the latter by rotation of said shift rail selector lever means about its axis.

3. Shifter mechanism for association with a multishift transmission having a plurality of parallel shift rails movable lengthwise of their longitudinal axes, and motor means including a force applying member and a control member coaxial of each other on an axis parallel with the axes of said shift rails comprising, a slide carriage mounted on said force applying member, a slide member mounted for sliding movement in said slide carriage in a direction transverse to the longitudinal axes of said force applying member and said shift rails, shift rail selector lever means, and means connecting said shift rail selector lever means with said slide member for effecting sliding movement of the latter by manipulation of said shift rail selector lever means.

4. Shifter mechanism for association with a multishift transmission having a housing open at the upper end and including a plurality of parallel shift rails movable lengthwise of their longitudinal axes, and motor means including a force applying member and a control member coaxial with each other on axis parallel with the axes of said shift rails, comprising a slide carriage mounted on said force applying member for movement therewith on an axis parallel to the axes of said shift rails, a slide member mounted for sliding movement in said slide carriage in a direction transverse to the longitudinal axes of said shift rails, a cover closing the opening of said transmission housing having its inner surface in juxtaposition of said slide member to retain the same in said slide carriage, shift rail selector lever means mounted for rotation laterally of the longitudinal axes of said shift rails, and pin and slot means between said shift rail selector lever means and one end of said slide member for effecting sliding movement of the latter for selectively positioning the other end of said slide member relative to said shift rails by rotation of said shift rail selector means.

5. Shifter mechanism for a transmission having a transmission housing open at its upper end and including a shift rail movable lengthwise of its longitudinal axis in said transmission housing below the opening thereof comprising, shift rail selector lever means mounted for rotation on an axis laterally of the longitudinal axis of said shift rail and below the opening of said transmission housing, a slide carriage mounted for movement on an axis parallel to the longitudinal axis of said shift rail and below the opening in said transmission housing, a slide member mounted for sliding movement in said slide carriage in a direction transverse to the longitudinal axes of said shift rail and slide carriage, a cover closing the opening of said transmission housing and having its inner surface in juxtaposition of said slide member, spring means engaging said slide carriage to yieldingly retain said slide member in engagement with the inner surface of said cover, and means connecting said shift rail selector lever means and said slide member for effecting sliding movement of the latter by rotation of said shift rail selector lever means about its axis.

6. Shifter mechanism for association with a multi-shift transmission having a housing open at the upper end and including a plurality of parallel shift rails movable lengthwise of their longitudinal axes, and motor means including a power cylinder, force applying tube means and control tube means coaxially with each other on an axis parallel with the axes of said shift rails, comprising a slide carriage mounted on said force applying means for movement therewith on an axis parallel to the axes of said shift rails, a slide member mounted for sliding movement in said slide carriage in a direction transverse of the longitudinal axes of said shift rails, a cover closing the opening of said transmission housing having its inner surface in juxtaposition of said slide member to retain the same in said slide carriage, shift rail selector lever means comprising a shaft mounted for rotation on an axis laterally of and normal to the axes of said shift rails, a first crank arm at one end of said shaft externally of the transmission housing, a second crank arm at the other end of said shaft internally of said transmission housing, and pin and slot means between said second crank arm and said slide member whereby said slide member is adapted to be selectively positioned relative to said shift rails by rotation of said shaft of said shift rail selector means.

7. Shifter mechanism for association with a multi-shift transmission having a housing open at the upper end and including a plurality of parallel shift rails movable lengthwise of their longitudinal axes, and motor means including a power cylinder, force applying tube means and control tube means coaxially with each other on an axis parallel with the axes of said shift rails, comprising a slide carriage mounted on said force applying means for movement therewith on an axis parallel to the axes of said shift rails, a slide member mounted for sliding movement in said slide carriage in a direction transverse of the longitudinal axes of said shift rails, a cover closing the opening of said transmission housing and having its inner surface in juxtaposition of said slide member, spring means between said slide carriage and said transmission housing for yieldingly engaging said slide member with the inner surface of said cover to retain said slide member in said slide carriage, shift rail selector lever means comprising a shaft mounted for rotation on an axis laterally of and normal to the axes of said shift rails, a first crank arm at one end of said shaft externally of the transmission housing, a second crank arm at the other end of said shaft internally of said transmission housing, and pin and slot means between said second crank arm and said slide member whereby said slide member is adapted to be selectively positioned relative to said shift rails by rotation of said shaft of said shift rail selector means.

References Cited in the file of this patent

UNITED STATES PATENTS

| | | |
|---|---|---|
| 2,113,860 | Sanford et al. | Apr. 12, 1938 |
| 2,252,273 | Price et al. | Aug. 12, 1941 |
| 2,262,233 | Hey | Nov. 11, 1941 |